(12) United States Patent
Li et al.

(10) Patent No.: US 10,575,365 B2
(45) Date of Patent: Feb. 25, 2020

(54) PDN CONNECTION RELEASE METHOD AND APPARATUS, AND USER EQUIPMENT

(71) Applicant: HUAWEI TECHNOLOGIES CO., LTD., Shenzhen, Guangdong (CN)

(72) Inventors: Yongcui Li, Beijing (CN); Hui Ni, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/001,731

(22) Filed: Jun. 6, 2018

(65) Prior Publication Data

US 2018/0288825 A1    Oct. 4, 2018

Related U.S. Application Data

(63) Continuation of application No. PCT/CN2015/099166, filed on Dec. 28, 2015.

(51) Int. Cl.
*H04W 76/30* (2018.01)
*H04W 4/02* (2018.01)

(52) U.S. Cl.
CPC ............ *H04W 76/30* (2018.02); *H04W 4/02* (2013.01)

(58) Field of Classification Search
CPC ........ H04W 76/30; H04W 76/34; H04W 4/02
See application file for complete search history.

(56) References Cited

U.S. PATENT DOCUMENTS

| 2010/0029283 | A1* | 2/2010 | Iwamura | ............... H04W 36/00 |
| 2010/0255808 | A1 | 10/2010 | Guo et al. | |
| 2012/0076121 | A1 | 3/2012 | Choi et al. | |
| 2012/0189016 | A1 | 7/2012 | Bakker et al. | |
| 2015/0296366 | A1 | 10/2015 | Lee et al. | |
| 2019/0230490 | A1 | 7/2019 | Lee et al. | |

FOREIGN PATENT DOCUMENTS

| CN | 101466083 A | 6/2009 |
| CN | 101483932 A | 7/2009 |
| CN | 102104980 A | 6/2011 |
| CN | 102107980 A | 6/2011 |
| CN | 103430580 A | 12/2013 |
| CN | 104904251 A | 9/2015 |
| EP | 2922319 A1 | 9/2015 |
| WO | 2014069925 A1 | 5/2014 |
| WO | WO2015149341 | * 10/2015 |
| WO | 2017113046 A1 | 7/2017 |

* cited by examiner

Primary Examiner — Ronald B Abelson

(74) Attorney, Agent, or Firm — Womble Bond Dickinson (US) LLP

(57) ABSTRACT

A PDN connection release method is disclosed. For one example, a user equipment may determine a service transmission status of a target packet data network PDN connection, location area information corresponding to the target PDN connection, and a current location of the user equipment, and may release the target PDN connection when the user equipment determines that a first condition is met. The target PDN connection can be any one or more of a plurality of PDN connections maintained by the user equipment. The first condition may include the service transmission status of the target PDN connection indicates that service transmission has stopped, and a location area indicated by the location area information corresponding to the target PDN connection does not include the current location of the user equipment.

19 Claims, 2 Drawing Sheets

PDN CONNECTION RELEASE METHOD AND APPARATUS, AND USER EQUIPMENT

CROSS-REFERENCE TO RELATED APPLICATIONS

This application is a continuation of International Application No. PCT/CN2015/099166, filed on Dec. 28, 2015, entitled "PDN CONNECTION RELEASE METHOD AND APPARATUS, AND USER EQUIPMENT," which is hereby incorporated by reference in its entirety.

TECHNICAL FIELD

The present invention relates to the field of communications, and in particular, to a packet data network (PDN) connection release method and apparatus, and user equipment.

BACKGROUND

Currently, evolved packet systems (EPS) support access of a plurality of packet data network (PDN) connections. To be specific, user equipment may access an external packet data network by establishing a plurality of PDN connections. A connection that is from a user equipment to a packet data network and that is based on the Internet Protocol (IP) is usually referred to as a PDN connection. A plurality of PDN connections can improve a network end-to-end throughput rate and network utilization.

However, it is found in practice that, when releasing one of a plurality of PDN connections, the EPS considers only whether the PDN connection is the last PDN connection, and releases the PDN connection if the PDN connection is not the last PDN connection. As such, a case in which a just released PDN connection is required by user equipment can easily occur, and therefore the PDN connection needs to be reestablished through signaling interworking resulting in network resource waste.

SUMMARY

PDN connection release method, apparatus, and user equipment to avoid network resource waste are disclosed.

According to one embodiment, a PDN connection release method is disclosed. In the method, user equipment may determine a service transmission status of a target packet data network PDN connection, location area information corresponding to the target PDN connection, and a current location of the user equipment. The user equipment, may release the target PDN connection when the user equipment determines that a first condition is met. The target PDN connection is any one or more of a plurality of PDN connections maintained by the user equipment. The first condition may include the service transmission status of the target PDN connection indicating that service transmission has stopped and a location area indicated by the location area information corresponding to the target PDN connection does not include the current location of the user equipment. In this embodiment, because the target PDN connection released by the user equipment is a PDN connection on which service transmission has stopped and the location area indicated by the location area information corresponding to the PDN connection does not include the current location of the user equipment, a probability of using the PDN connection when the user equipment performs service transmission is relatively low so that a network resource waste caused by PDN connection reestablishment that occurs when the PDN connection is randomly released can be avoided.

The location area information corresponding to the target PDN connection may be a cell identity list, a base station identity group, a routing area identity list, a forwarding area identity list, or the like. The current location of the user equipment may be a location identified by a cell identity broadcast by a wireless access point such as a base station, or may be a physical location determined by the user equipment by using a positioning technology. The service transmission status of the target PDN connection may include two types of information: service transmission has stopped and service transmission is ongoing.

According to one embodiment, the first condition may further include the location area indicated by the location area information of the target PDN connection does not include an area adjacent to the current location of the user equipment and the adjacent area is at least one location through which the user equipment passes in a mobile handover processor a location area covered by a base station adjacent to a base station covering the current location of the user equipment.

For one embodiment, when the user equipment determines that the first condition is met, the user equipment may release the target PDN connection. The first condition can be met when the service transmission status of the target PDN connection indicates service transmission has stopped and the location area indicated by the location area information does not include the current location of the user equipment and the area adjacent to the current location of the user equipment.

In this embodiment, when the location area indicated by the location area information of the target PDN connection includes the location area covered by the base station adjacent to the base station currently associated with the user equipment or a coverage area of a wireless access point that was associated with the user equipment, the target PDN connection may be prevented from being released in order to avoid network resource waste as a result of the PDN connection needing to be reestablished when the user equipment in a moving state re-enters the location area indicated by the location area information of the target PDN connection.

According to one embodiment, the first condition may further include the location area indicated by the location area information of the target PDN connection includes the area adjacent to the current location of the user equipment yet the duration in which service transmission on the target PDN connection has stopped can be greater than a preset threshold.

For one embodiment, when the user equipment determines that the first condition is met, the user equipment can release the target PDN connection. The first condition can be met when the service transmission status of the target PDN connection indicates service transmission has stopped and the location area indicated by the location area information does not include the current location of the user equipment but includes the area adjacent to the current location of the user equipment yet the duration in which service transmission on the target PDN connection has stopped can be greater than the preset threshold.

For one embodiment, the use equipment can release the target PDN connection when a condition is met. The condition can be met when the service transmission status of the target PDN connection indicates service transmission has stopped, the location area indicated by the location area information does not include the current location of the user equipment but includes the area adjacent to the current location of the user equipment, and the duration in which service transmission on the target PDN connection has stopped is greater than the preset threshold. The user equipment may still release the PDN connection in this condition to avoid a network resource waste caused when the PDN connection is randomly released and when the user equipment maintains the expired PDN connection.

According to one embodiment, the first condition may further include the service transmission status of the target PDN connection indicating service transmission has stopped and the location area indicated by the location area information corresponding to the target PDN connection includes the current location of the user equipment. For one embodiment, the duration in which service transmission on the target PDN connection has stopped can be greater than the preset threshold.

For one embodiment, when the user equipment determines that the first condition is met, the user equipment may release the target PDN connection. The first condition can be met when the service transmission status of the target PDN connection indicates service transmission has stopped and the location area indicated by the location area information corresponding to the target PDN connection includes the current location of the user equipment but the duration in which service transmission on the target PDN connection has stopped can be greater than the preset threshold.

In this embodiment, when the service transmission status of the target PDN connection indicates service transmission has stopped and the location area indicated by the location area information includes the current location of the user equipment, but the duration in which service transmission on the target PDN connection has stopped is greater than the preset threshold, the user equipment may still release the PDN connection to avoid a network resource waste caused when the PDN connection is randomly released and when the user equipment maintains the expired PDN connection.

For one embodiment, the area adjacent to the current location of the user equipment is sent, in a broadcast manner, by a base station serving the user equipment, or is recorded by the user equipment in the mobile handover process.

According to one embodiment, when the user equipment is in an idle state, the user equipment can release the target PDN connection and may be sending, by the user equipment, a location update request to a control plane network element, where the location update request is used by the control plane network element to initiate a procedure of releasing the target PDN connection. The location update request may include a connection identifier used to identify the target PDN connection, and may further include a connection release instruction used to instruct to release the target PDN connection.

According to one embodiment, a PDN connection release apparatus includes a determining module and a release module. The determining module can be configured to determine a service transmission status of a target PDN connection, location area information corresponding to the target PDN connection, and a current location of user equipment, where the target PDN connection is any one or more of a plurality of PDN connections maintained by the user equipment. The release module can be configured to release the target PDN connection when it is determined that a first condition is met. The first condition may include the service transmission status of the target PDN connection indicating service transmission has stopped and a location area indicated by the location area information corresponding to the target PDN connection does not include the current location of the user equipment. The PDN connection release apparatus may further include another module or unit, and perform any one or more of steps or implementations of the PDN connection release methods disclosed herein.

According to one embodiment, a user equipment includes a processor, a memory, and a communications interface. The processor is configured to determine a service transmission status of a target PDN connection, location area information corresponding to the target PDN connection, and a current location of the user equipment, where the target PDN connection is any one or more of a plurality of PDN connections maintained by the user equipment. The memory is configured to store the service transmission status of the target PDN connection, the location area information corresponding to the target PDN connection, and the current location of the user equipment that are determined by the processor. The processor is further configured to release the target PDN connection by using the communications interface when it is determined that a first condition is met. The first condition may include the service transmission status of the target PDN connection is that service transmission has stopped and a location area indicated by the location area information corresponding to the target PDN connection does not include the current location of the user equipment. The user equipment may further perform any one or more of steps or implementations of the PDN connection release methods disclosed herein.

BRIEF DESCRIPTION OF DRAWINGS

The appended drawings illustrate examples and are, therefore, exemplary embodiments and not be considered limiting in scope.

DESCRIPTION OF EMBODIMENTS

The following detailed description provides technical details and solutions to implement the disclosed embodiments. Modifications or variations of technical details and solutions can be made without departing from the scope of the disclosed embodiments.

Figure 1:
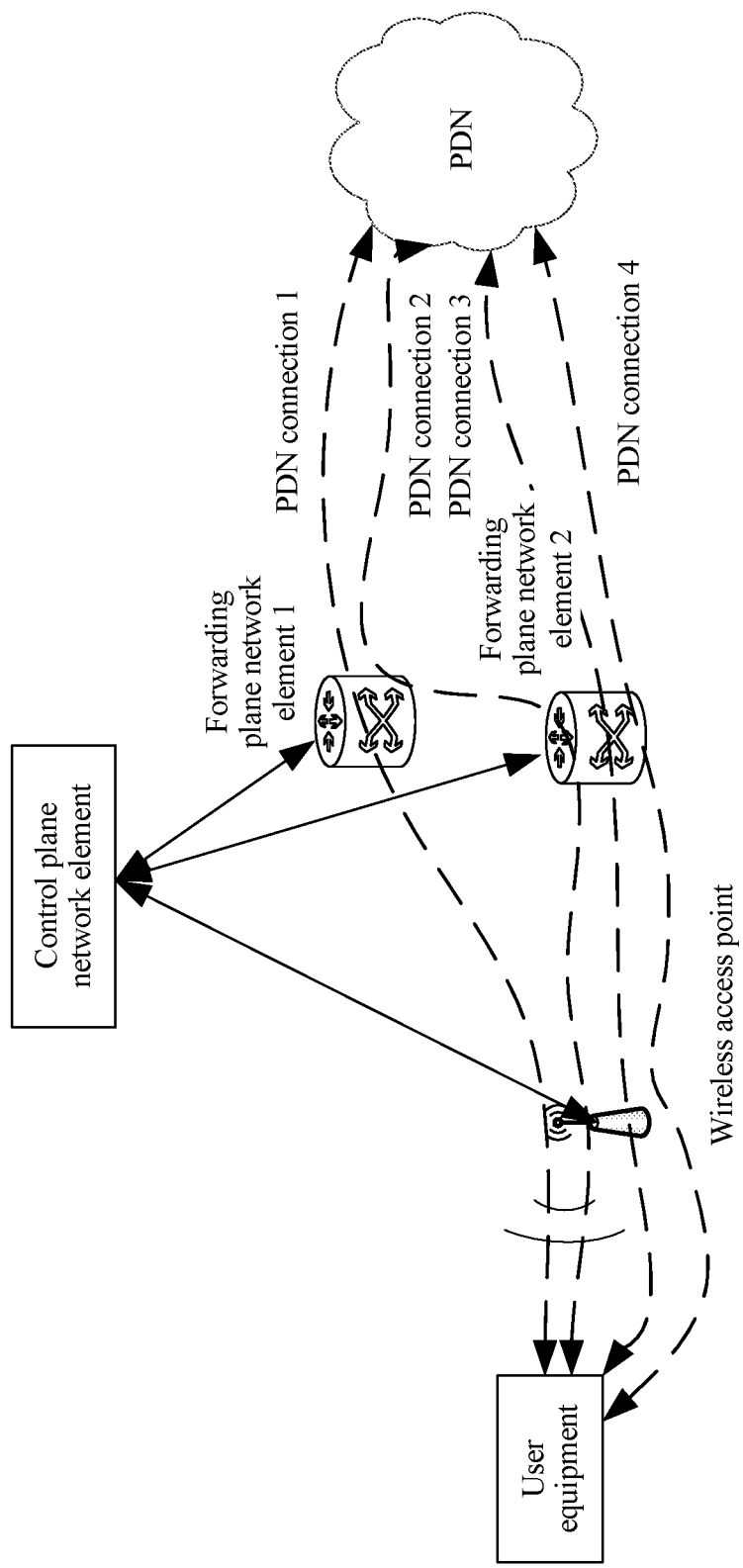
FIG. 1 is a system structure diagram of a plurality of PDN connections according to one embodiment.

FIG. 1 illustrates a system structure diagram of a plurality of PDN connections according to one embodiment. As shown in FIG. 1, a system architecture of the plurality of PDN connections includes user equipment, a wireless access point (the wireless access point includes at least one of a 3G wireless access point 1, a 4G wireless access point 2, a Wi-Fi wireless access point 3, and the like) associated with the user equipment at a current location, a control plane network element, a forwarding plane network element 1, a forwarding plane network element 2, and the like. The user equipment may be any mobile or portable user equipment, including, but not limited to, a mobile phone, a mobile computer, a tablet computer, a personal digital assistant (PDA), a media player, a smart television, and a combination of the foregoing two or more items. The wireless access point is a device providing the user equipment with wireless access, and includes but is not limited to a base station in 3G/4G, LTE, or WiMAX, or a wireless access point in Wi-Fi. The control plane network element is responsible for mobility management in a mobile network and allocating, to each PDN connection, a forwarding plane device on an optimal path. The control plane network element may include some functions of a mobility management entity (MME), some functions of a mobile gateway controller, and the like. The forwarding plane network element is configured to provide the user equipment with a forwarding device that implements IP address anchoring, for example, a physical or virtual forwarding device such as a P-GW, a router, or a switch.

As shown in FIG. 1, the user equipment may establish a plurality of PDN connections by using a same forwarding plane network element or a plurality of forwarding plane network elements, to access a PDN network. The plurality of PDN connections are communications connections through which the user equipment accesses the PDN network based on a plurality of IP addresses. The plurality of PDN connections enable the user equipment to simultaneously have a plurality of paths to a target node, for example, a path 1 based on a PDN connection 1, a path 2 based on a PDN connection 2, a path 3 based on a PDN connection 3, and a path 4 based on a PDN connection 4. For the user equipment with the plurality of PDN connections, when releasing a PDN connection, the user equipment considers only whether the PDN connection is the last PDN connection, and may release the PDN connection if the PDN connection is not the last PDN connection. For one embodiment, after the PDN connection is released, such a PDN connection may need to be immediately established, resulting in frequent signaling interworking and a network resource waste.

The disclosed embodiments detail and implement a PDN connection release method and apparatus, and user equipment, to avoid network resource waste.

Figure 2:
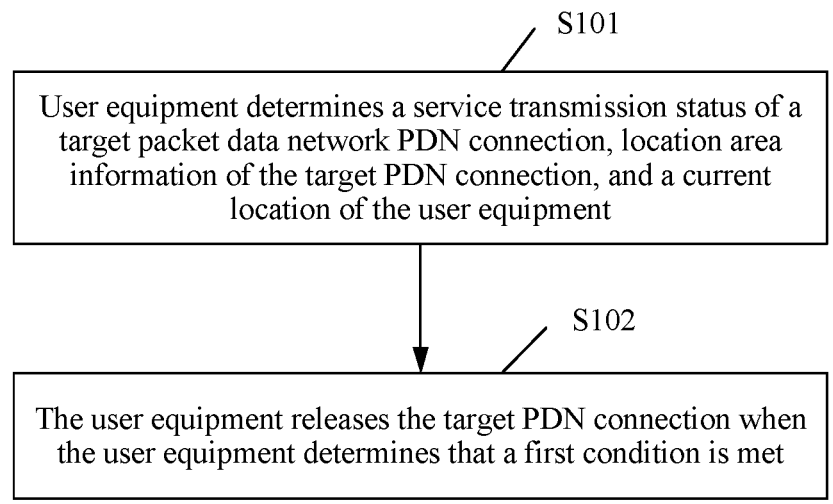
FIG. 2 is a schematic flowchart of a PDN connection release method according to one embodiment.

Referring to FIG. 2, FIG. 2 is a schematic flowchart of a PDN connection release method according to one embodiment. As shown in FIG. 2, the PDN connection release method may include the steps S101 and S102.

At S101, user equipment determines a service transmission status of a target packet data network PDN connection, location area information of the target PDN connection, and a current location of the user equipment.

For one embodiment, the target PDN connection can be any one or more of a plurality of PDN connections currently maintained by the user equipment, for example, the PDN connection 1, the PDN connection 2, the PDN connection 3, and the PDN connection 4 shown in FIG. 1.

For one embodiment, the service transmission status of the target PDN connection may include two types of information: (1) service transmission has stopped and (2) service transmission is ongoing. The service transmission status of the target PDN connection may be determined by the user equipment in real time through querying. The current location of the user equipment may be a location identified by a cell identity broadcast by a wireless access point such as a base station, may be a physical location determined by the user equipment by using a positioning technology, may be a location identified by a tracking area identity, or may be a routing area identity.

For one embodiment, the location area information corresponding to the target PDN connection may be a cell identity list, a base station identity group, a routing area identity list, a forwarding area identity list, or the like. The location area information may be obtained from a control plane network element in a PDN connection establishment process, may be obtained from a broadcast message of a base station, or may be obtained from an access network discovery and selection function (ANDSF) server.

For example, in a process of establishing each PDN connection, a manner of obtaining location area information of the PDN connection from a control plane network element may include the following steps: The user equipment sends a connection establishment request to a wireless access point (such as a base station in 3G/4G LTE, or WiMAX, or a wireless access point in Wi-Fi), where the connection establishment request includes current location information (such as a cell identity, a base station identity, a routing area identity, or a located physical location) of the user equipment; the wireless access point sends the connection establishment request to the control plane network element, and after receiving the connection establishment request, the control plane network element selects a forwarding plane network element for the user equipment based on the current location information of the user equipment and a service range of the forwarding plane network element, and determines the location area information (a location range indicated by the location area information includes a location indicated by the current location information of the user equipment) of the connection; the control plane network element or the forwarding plane network element may allocate, to the connection, a PDN connection address anchored on the forwarding plane network element; and the control plane network element sends a connection establishment response message to the wireless access point, where the connection establishment response message includes the location area information that is of the connection and that uses an IP address as an index.

For one embodiment, the user equipment may determine location area information of a plurality of PDN connections. The location area information corresponding to the plurality of PDN connections may be stored in the user equipment in a form of a relationship table. For another embodiment, a correspondence between the PDN connections and the location area information may be established in another form, for example, a form of a hash algorithm. Table 1 is a relationship table of the location area information that is determined by the user equipment and that is corresponding to the plurality of PDN connections according to this embodiment of the present disclosure. As shown in Table 1, an IP address of each PDN connection is used as an index in the relationship table. The IP address is a logical address allocated when the PDN connection is established, or a logical address used to access a network. Each PDN connection uses an IP address as an identifier, that is corresponding to location area information of the PDN connection. The location area information may indicate, by using a cell identity list, a physical location range, a location area identity list, a routing area identity list, a forwarding area identity list, a base station identity list, or the like, a range to which the PDN connection is applicable.

TABLE 1

Relationship table

| | |
|---|---|
| $IP_1$ | Location area information 1 |
| $IP_2$ | Location area information 2 |
| $IP_3$ | Location area information 3 |
| $IP_4$ | Location area information 4 |

At S102, the user equipment releases the target PDN connection when the user equipment determines that a first condition is met.

For one embodiment, the first condition may include the service transmission status of the target PDN connection is that service transmission has stopped, and a location area indicated by the location area information corresponding to the target PDN connection does not include the current location of the user equipment.

For one embodiment, in a process of releasing the target PDN connection by the user equipment, the wireless access point, the control plane network element, the forwarding plane network element, and the like that are associated with the user equipment may delete information related to the target PDN connection. In addition, the user equipment may also delete the location area information corresponding to the target PDN connection, and delete a correspondence between the target PDN connection and the location area information from the relationship table.

For one embodiment, if the user equipment is in an idle state, the process of releasing the target PDN connection by the user equipment may implement the following operation or steps.

First, the user equipment initiates a location update procedure, and sends a location update request to the control plane network element. The location update request is used by the control plane network element to initiate a procedure of releasing the target PDN connection. The location update request may include a connection identifier used to identify the target PDN connection and/or a connection release instruction used to instruct to release the target PDN connection. Optionally, the location update request may not include the two identifiers. For example, it is preset in the control plane network element that, when receiving the location update request, the control plane network element may initiate a procedure of releasing any one or more of the plurality of PDN connections maintained by the user equipment.

The location update procedure may be a tracking area update (TAU) procedure or a routing area update (RAU) procedure. The location area update procedure may be periodically triggered by a timer, or may be triggered when the user equipment enters a new tracking area, and the tracking area is not in a tracking area identity (TAI) list. This is not limited in this embodiment of the present disclosure.

For one embodiment, when service transmission on a PDN connection in the plurality of PDN connections maintained by the user equipment has stopped, the user equipment may be triggered to perform operations in steps S101 and S102. When the user equipment moves and a handover occurs, for example, a cell handover in a 3G/4G cellular network, or a wireless access point handover in a Wi-Fi or WiMAX network, the user equipment may further be triggered to perform the operations in steps S101 and S102 on the plurality of maintained PDN connections. When the user equipment is in the idle state, the user equipment may further be triggered, by using the location update procedure, to perform the operations in steps S101 and S102. When the user equipment enters from the idle state to a connected state, the user equipment may further be triggered to perform the operations in steps S101 and S102 on the plurality of maintained PDN connections. For one embodiment, the user equipment is in the connected state indicating that there is an air interface connection between the user equipment and a base station. The user equipment can also be in the idle state indicating that there is no dedicated air interface connection between the user equipment and the base station.

For another embodiment, when determining that the first condition is not met, the user equipment may retain the target PDN connection. For example, when the service transmission status of the target PDN connection is that service transmission has stopped, but the location area indicated by the location area information includes the current location of the user equipment, or when the service transmission status of the target PDN connection is that service transmission does not stop, the user equipment may retain the target PDN connection.

For one embodiment, in the PDN connection release method of FIG. 2, the user equipment may determine the service transmission status of the target packet data network PDN connection. When the service transmission status of the target PDN connection is that service transmission has stopped, and the location area indicated by the location area information corresponding to the target PDN connection does not include the current location of the user equipment, the user equipment may release the target PDN connection. Because the PDN connection released by the user equipment is a PDN connection on which service transmission has stopped, and the location area indicated by the location area information does not include the current location of the user equipment, a probability of using the PDN connection when the user equipment performs service transmission is relatively low, so that a network resource waste caused by PDN connection reestablishment that occurs when the PDN connection is randomly released can be avoided.

For one embodiment, the first condition may further include the location area indicated by the location area information of the target PDN connection does not include an area adjacent to the current location of the user equipment. When the user equipment determines that the first condition is met, that is, when the service transmission status of the target PDN connection is that service transmission has stopped, and the location area indicated by the location area information does not include the current location of the user equipment and the area adjacent to the current location of the user equipment, the user equipment may release the target PDN connection.

For another embodiment, when the user equipment determines that the first condition is not met, the user equipment may retain the target PDN connection. The first condition can be met when the service transmission status of the target PDN connection is that service transmission has stopped, but the location area indicated by the location area information includes the current location of the user equipment, or when the service transmission status of the target PDN connection is that service transmission does not stop, or when the service transmission status of the target PDN connection is that service transmission has stopped, and the location area indicated by the location area information does not include the current location of the user equipment but includes the area adjacent to the current location of the user equipment.

For other embodiments, when it is determined that the service transmission status of the target PDN connection is that service transmission has stopped, and the location area indicated by the location area information does not include the current location of the user equipment, the user equipment may determine whether the location area indicated by the location area information of the target PDN connection includes the area adjacent to the current location of the user equipment, and release the target PDN connection if the location area indicated by the location area information of the target PDN connection does not include the area adjacent to the current location of the user equipment. The user equipment may also retain the target PDN connection if the location area indicated by the location area information of the target PDN connection includes the area adjacent to the current location of the user equipment.

For one embodiment, the adjacent area is at least one location through which the user equipment passes in a mobile handover process, for example, a coverage area of a wireless access point that was associated with the user equipment, or a location area covered by a base station adjacent to a base station covering the current location of the user equipment. If the adjacent area is the location area covered by the base station adjacent to the base station covering the current location of the user equipment, the adjacent area may be sent to the user equipment when the user equipment accesses the base station.

For one embodiment, the target PDN connection may be released only when service transmission on the target PDN connection has stopped, and the location area indicated by the location area information of the target PDN connection does not include the current location of the user equipment, and the location area covered by the base station adjacent to the base station currently associated with the user equipment, or the coverage area of the wireless access point that was associated with the user equipment. Therefore, when the location area indicated by the location area information of the target PDN connection includes the location area covered by the base station adjacent to the base station currently associated with the user equipment, or the coverage area of the wireless access point that was associated with the user equipment, the target PDN connection is prevented from being released, to avoid a network resource waste caused by PDN connection reestablishment that occurs when the user equipment in a moving state re-enters the location area indicated by the location area information of the target PDN connection.

For one embodiment, the first condition may further include the location area indicated by the location area information of the target PDN connection includes the area adjacent to the current location of the user equipment, but duration in which service transmission on the target PDN connection has stopped is greater than a preset threshold. When the user equipment determines that the first condition is met, the user equipment can release the target PDN connection. The first condition can be met when the service transmission status of the target PDN connection is that service transmission has stopped, and the location area indicated by the location area information does not include the current location of the user equipment but includes the area adjacent to the current location of the user equipment, but the duration in which service transmission on the target PDN connection has stopped is greater than the preset threshold.

For another embodiment, when the user equipment determines that the first condition is not met, the user equipment may retain the target PDN connection. The first condition can be met when the service transmission status of the target PDN connection is that service transmission has stopped, but the location area indicated by the location area information includes the current location of the user equipment. The first condition can also be met when the service transmission status of the target PDN connection is that service transmission does not stop, or when the service transmission status of the target PDN connection is that service transmission has stopped, and the location area indicated by the location area information does not include the current location of the user equipment but includes the area adjacent to the current location of the user equipment. The first condition can also be met when the service transmission status of the target PDN connection is that service transmission has stopped, the location area indicated by the location area information does not include the current location of the user equipment but includes the area adjacent to the current location of the user equipment, and the duration in which service transmission on the target PDN connection has stopped is not greater than the preset threshold.

For another embodiment, when determining that the service transmission status of the target PDN connection is that service transmission has stopped, and the location area indicated by the location area information of the target PDN connection does not include the current location of the user equipment but includes the area adjacent to the current location of the user equipment, the user equipment may determine whether the duration in which service transmission on the target PDN connection has stopped is greater than the preset threshold. When determining that the duration is greater than the preset threshold, the user equipment may release the target PDN connection. When determining that the duration is not greater than the preset threshold, the user equipment may retain the target PDN connection. For one embodiment, when service transmission on the target PDN connection has stopped, the duration in which service transmission on the target PDN connection has stopped may be obtained by triggering a timer to perform timing. The preset threshold may be set by the user equipment based on power consumption and a network resource, or may be sent to the user equipment after the preset threshold is set on a network side.

When the service transmission status of the target PDN connection is that service transmission has stopped, and the location area indicated by the location area information does not include the current location of the user equipment but includes the area adjacent to the current location of the user equipment, but the duration in which service transmission on the target PDN connection has stopped is greater than the preset threshold, the user equipment may still release the PDN connection. In this way, network resource waste can be avoided caused when the PDN connection is randomly released and when the user equipment maintains the expired PDN connection.

For one embodiment, the first condition may further include the service transmission status of the target PDN connection is that service transmission has stopped, and the location area indicated by the location area information corresponding to the target PDN connection includes the current location of the user equipment, but the duration in which service transmission on the target PDN connection has stopped is greater than the preset threshold. When the user equipment determines that the first condition is met, the user equipment may release the target PDN connection. The first condition can be met when the service transmission status of the target PDN connection is that service transmission has stopped, and the location area indicated by the location area information corresponding to the target PDN connection includes the current location of the user equipment, but the duration in which service transmission on the target PDN connection has stopped is greater than the preset threshold.

For another embodiment, when the service transmission status of the target PDN connection is that service transmission has stopped, and the location area indicated by the location area information corresponding to the target PDN connection includes the current location of the user equipment, the user equipment may determine whether the duration in which service transmission on the target PDN connection has stopped is greater than the preset threshold. If so, the user equipment can release the target PDN connection when determining that the duration is greater than the preset threshold, or may retain the target PDN connection when determining that the duration is not greater than the preset threshold.

When the service transmission status of the target PDN connection is that service transmission has stopped, and the location area indicated by the location area information includes the current location of the user equipment, but the duration in which service transmission on the target PDN connection has stopped is greater than the preset threshold, the user equipment may still release the PDN connection. In this way, network resource waste can be avoided caused when the PDN connection is randomly released and when the user equipment maintains the expired PDN connection.

Figure 3:
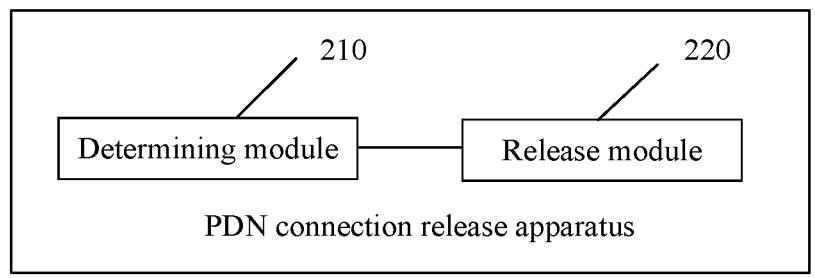
FIG. 3 is a schematic structural diagram of a PDN connection release apparatus according to one embodiment.

FIG. 3 illustrates a schematic structural diagram of a PDN connection release apparatus according to one embodiment. As shown in FIG. 3, the PDN connection release apparatus may include a determining module 210 and a release module 220.

The determining module 210 is configured to determine a service transmission status of a target PDN connection, location area information corresponding to the target PDN connection, and a current location of user equipment, and the target PDN connection is any one or more of a plurality of PDN connections maintained by the user equipment.

The release module 220 is configured to release the target PDN connection when it is determined that a first condition is met. The first condition may include the service transmission status of the target PDN connection is that service transmission has stopped, and a location area indicated by the location area information corresponding to the target PDN connection does not include the current location of the user equipment.

For one embodiment, the first condition may further include the location area indicated by the location area information of the target PDN connection does not include an area adjacent to the current location of the user equipment. The adjacent area is at least one location through which the user equipment passes in a mobile handover process, or a location area covered by a base station adjacent to a base station covering the current location of the user equipment. When it is determined that the first condition is met, the release module 220 may release the target PDN connection. The first condition can be met when the service transmission status of the target PDN connection is that service transmission has stopped, and the location area indicated by the location area information does not include the current location of the user equipment and the area adjacent to the current location of the user equipment.

For another embodiment, a retaining module may further configured to retain the target PDN connection when it is determined that the first condition is not met. The first condition is met when the service transmission status of the target PDN connection is that service transmission has stopped, but the location area indicated by the location area information includes the current location of the user equipment. The first condition is also met when the service transmission status of the target PDN connection is that service transmission does not stop, or when the service transmission status of the target PDN connection is that service transmission has stopped, and the location area indicated by the location area information does not include the current location of the user equipment but includes the area adjacent to the current location of the user equipment.

For one embodiment, the first condition may further include the location area indicated by the location area information of the target PDN connection includes the area adjacent to the current location of the user equipment, but duration in which service transmission on the target PDN connection has stopped is greater than a preset threshold. When it is determined that the first condition is met, that is, when the service transmission status of the target PDN connection is that service transmission has stopped, and the location area indicated by the location area information does not include the current location of the user equipment but includes the area adjacent to the current location of the user equipment, but the duration in which service transmission on the target PDN connection has stopped is greater than the preset threshold, the release module 220 may release the target PDN connection.

For one embodiment, when the user equipment is in an idle state, that the release module 220 releases the target PDN connection may be sending a location update request to a control plane network element. The location update request is used by the control plane network element to initiate a procedure of releasing the target PDN connection. The location update request may include a connection identifier used to identify the target PDN connection, and may also include a connection release instruction used to instruct to release the target PDN connection.

For one embodiment, the PDN connection release apparatus may perform any one or more of steps or implementations of the PDN connection release method shown in FIG. 1.

Figure 4:
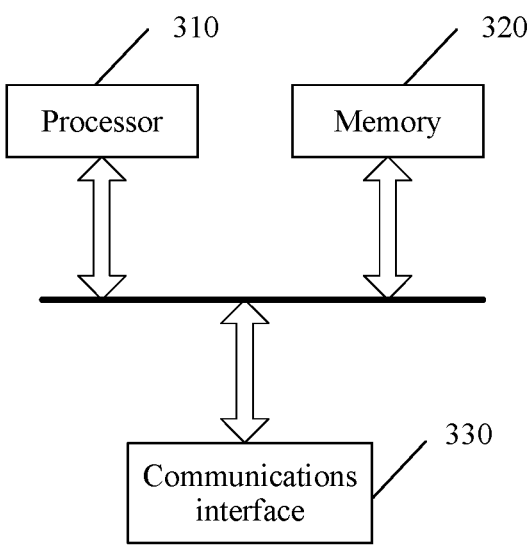
FIG. 4 is a schematic structural diagram of user equipment according to one embodiment.

FIG. 4 illustrates a schematic structural diagram of user equipment according to one embodiment. As shown in FIG. 4, the user equipment may include a processor 310, a memory 320, and a communications interface 330. The structure of the user equipment shown in FIG. 4 are exemplary may include other components. The structure may be a bus structure or a star structure, and may include more or fewer parts than those shown in the figure, or combine some parts, or have different part arrangements.

For one embodiment, the processor 310 is a control center of the user equipment, is connected to all parts of the user equipment by using various interfaces and lines, and performs various functions of the user equipment and/or processes data by running or executing a software program and/or a module stored in a storage unit, and invoking data stored in the storage unit. The processor 310 may include an integrated circuit (IC), for example, may include a single packaged IC, or may include a plurality of connected packaged ICs with a same function or different functions. For example, the processor 310 may include only a central processing unit (CPU), or may be a combination of a GPU, a digital signal processor (DSP), and a control chip (for example, a baseband chip) in a communications unit. In an implementation of the present disclosure, the CPU may be a single computing core, or may include a plurality of computing cores.

For one embodiment, the memory 320 may be configured to store a software program and a module. The processor 310 performs various function applications of the user equipment and implements data processing by running the software program and the module that are stored in the memory 320. The memory 320 mainly includes a program storage area and a data storage area. The program storage area may store an operating system, and an application program required by at least one function, for example, a PDN connection release program. The data storage area may store data created based on use of the user equipment, and the like. For one embodiment, the memory 320 may include a volatile memory such as a nonvolatile random access memory (NVRAM), a phase change random access memory (Phase Change RAM, PRAM), or a magneto-resistive random access memory (Magneto-resistive RAM, MRAM), or may include a nonvolatile memory such as at least one disk storage component, an electrically erasable programmable read-only memory (EEPROM), or a flash memory component such as a NOR flash memory or a NAND flash memory. The nonvolatile memory stores an operating system and an application program that are executed by a processing unit. The processor 310 loads, from the nonvolatile memory, a running program and data to memory, and stores digital content in a mass storage apparatus. The operating system includes various components and/or drivers that are configured to control and manage a routine system task, for example, memory management, storage device control, and power management, and that facilitate communication between various types of software and hardware. In an implementation of the present disclosure, the operating system may be an Android system of Google, an iOS system developed by Apple, a Windows operating system developed by Microsoft, an embedded operating system such as VxWorks, or the like.

For one embodiment, the communications interface 330 is configured to establish a communications channel, so that the user equipment is connected to a remote server by using the communications channel, and downloads media data from the remote server. The communications interface 330 may include a communications module such as a wireless local area network wireless LAN) module, a Bluetooth module, or a baseband module, and a radio frequency (RF) circuit corresponding to the communications module; and is configured to perform wireless local area network communication, Bluetooth communication, infrared communication, and/or cellular communications system communication, for example, Wideband Code Division Multiple Access (WCDMA) and/or High Speed Downlink Packet Access (HSDPA). The communications module is configured to control communication among components in the user equipment, and may support direct memory access.

For one embodiment, the processor 310 is configured to determine a service transmission status of a target PDN connection, location area information corresponding to the target PDN connection, and a current location of the user equipment, and the target PDN connection is any one or more of a plurality of PDN connections maintained by the user equipment. The memory 320 is configured to store the service transmission status of the target PDN connection, the location area information corresponding to the target PDN connection, and the current location of the user equipment that are determined by the processor. The processor 310 is further configured to release the target PDN connection by using the communications interface 330 when it is determined that a first condition is met. The first condition includes: the service transmission status of the target PDN connection is that service transmission has stopped, and a location area indicated by the location area information corresponding to the target PDN connection does not include the current location of the user equipment.

For one embodiment, the first condition may further include the location area indicated by the location area information of the target PDN connection does not include an area adjacent to the current location of the user equipment. The adjacent area is at least one location through which the user equipment passes in a mobile handover process, or a location area covered by a base station adjacent to a base station covering the current location of the user equipment. When it is determined that the first condition is met, that is, when the service transmission status of the target PDN connection is that service transmission has stopped, and the location area indicated by the location area information does not include the current location of the user equipment and the area adjacent to the current location of the user equipment, the processor 310 may release the target PDN connection.

For one embodiment, the first condition further includes: the location area indicated by the location area information of the target PDN connection includes the area adjacent to the current location of the user equipment, but duration in which service transmission on the target PDN connection has stopped is greater than a preset threshold. When it is determined that the first condition is met, that is, when the service transmission status of the target PDN connection is that service transmission has stopped, and the location area indicated by the location area information does not include the current location of the user equipment but includes the area adjacent to the current location of the user equipment, but the duration in which service transmission on the target PDN connection has stopped is greater than the preset threshold, the processor 310 may release the target PDN connection.

For one embodiment, when the user equipment is in an idle state, that the processor 310 releases the target PDN connection by using the communications interface is sending a location update request to a control plane network element by using the communications interface. The location update request is used by the control plane network element to initiate a procedure of releasing the target PDN connection. The location update request may include a connection identifier used to identify the target PDN connection. The location update request may further include a connection release instruction used to instruct to release the target PDN connection.

For one embodiment, a computer storage medium stores a computer program. When the computer program in the computer storage medium is read by a computer, the computer can be enabled to complete or execute the steps of the PDN connection releasing method in the disclosed embodiments.

For one embodiment, all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The foregoing describes in detail the PDN connection release method and apparatus, and the user equipment to implement the disclosed embodiments. In this specification, specific examples are used to describe the principle and implementations of the present disclosure, and the description of the embodiments is only intended to help understand the method and core idea of the present disclosure in which the scope of the invention is defined by the appended claims.

What is claimed is:

1. A PDN connection release method, comprising:
    determining, by a user equipment, a service transmission status of a target packet data network (PDN) connection, location area information corresponding to the target PDN connection, and a current location of the user equipment, wherein the target PDN connection is any one or more of a plurality of PDN connections maintained by the user equipment; and
    releasing, by the user equipment, the target PDN connection when the user equipment determines that a first condition is met, wherein the first condition includes the service transmission status of the target PDN connection indicating service transmission has stopped, and a location area indicated by the location area information corresponding to the target PDN connection does not comprise the current location of the user equipment, and wherein the location area indicated by the location area information of the target PDN connection does not comprise an area adjacent to the current location of the user equipment, the adjacent area being at least one location through which the user equipment passes in a mobile handover process.

2. The method according to claim 1, wherein the first condition further includes:
the location area indicated by the location area information of the target PDN connection does not comprise a location area covered by a base station adjacent to a base station covering the current location of the user equipment.

3. The method according to claim 1, wherein the first condition further includes:
the location area indicated by the location area information of the target PDN connection comprises an area adjacent to the current location of the user equipment, but duration in which service transmission on the target PDN connection has stopped is greater than a preset threshold, wherein the adjacent area is at least one location through which the user equipment passes in a mobile handover process, or a location area covered by a base station adjacent to a base station covering the current location of the user equipment.

4. The method according to claim 2, wherein the area adjacent to the current location of the user equipment is sent, in a broadcast manner, by a base station serving the user equipment.

5. The method according to claim 2, wherein the area adjacent to the current location of the user equipment is recorded by the user equipment in the mobile handover process.

6. The method according to claim 3, wherein the area adjacent to the current location of the user equipment is sent, in a broadcast manner, by a base station serving the user equipment.

7. The method according to claim 3, wherein the area adjacent to the current location of the user equipment is recorded by the user equipment in the mobile handover process.

8. The method according to claim 1, wherein when the user equipment is in an idle state, releasing the target PDN connection comprises:
sending, by the user equipment, a location update request to a control plane network element, wherein the location update request is used for initiating a procedure of releasing the target PDN connection, and the location update request comprises a connection identifier used to identify the target PDN connection.

9. The method according to claim 8, wherein the location update request further comprises a connection release instruction used to instruct to release the target PDN connection.

10. A user equipment comprising: a processor, a memory, and a communications interface, wherein
the processor is configured to determine a service transmission status of a target packet data network (PDN) connection, location area information corresponding to the target PDN connection, and a current location of the user equipment, wherein the target PDN connection is any one or more of a plurality of PDN connections maintained by the user equipment;
the memory is configured to store the service transmission status of the target PDN connection, the location area information corresponding to the target PDN connection, and the current location of the user equipment that are determined by the processor; and
the processor is further configured to release the target PDN connection by using the communications interface when a first condition is met, wherein the first condition comprises: the service transmission status of the target PDN connection is that service transmission has stopped, and a location area indicated by the location area information corresponding to the target PDN connection does not comprise the current location of the user equipment, and wherein the location area indicated by the location area information of the target PDN connection does not comprise an area adjacent to the current location of the user equipment, the adjacent area being at least one location through which the user equipment passes in a mobile handover process.

11. The user equipment according to claim 10, wherein the first condition further comprises:
the location area indicated by the location area information of the target PDN connection does not comprise a location area covered by a base station adjacent to a base station covering the current location of the user equipment.

12. The user equipment according to claim 10, wherein the first condition further comprises:
the location area indicated by the location area information of the target PDN connection comprises an area adjacent to the current location of the user equipment, but duration in which service transmission on the target PDN connection has stopped is greater than a preset threshold, wherein the adjacent area is at least one location through which the user equipment passes in a mobile handover process, or a location area covered by a base station adjacent to a base station covering the current location of the user equipment.

13. The user equipment according to claim 11, wherein the area adjacent to the current location of the user equipment is sent, in a broadcast manner, by a base station serving the user equipment.

14. The user equipment according to claim 11, wherein the area adjacent to the current location of the user equipment is recorded by the user equipment in the mobile handover process.

15. The user equipment according to claim 12, wherein the area adjacent to the current location of the user equipment is sent, in a broadcast manner, by a base station serving the user equipment.

16. The user equipment according to claim 12, wherein the area adjacent to the current location of the user equipment is recorded by the user equipment in the mobile handover process.

17. The user equipment according to claim 10, wherein when the user equipment is in an idle state, to release the target PDN connection, the processor is configured to:
send a location update request to a control plane network element by using the communications interface, wherein the location update request is used for initiating a procedure of releasing the target PDN connection, and the location update request comprises a connection identifier used to identify the target PDN connection.

18. The user equipment according to claim 17, wherein the location update request further comprises a connection release instruction used to instruct to release the target PDN connection.

19. A non-transitory computer-readable medium storing computer instructions for execution by one or more processors, wherein the computer instructions instruct the one or more processors to perform an operation comprising:
- determining a service transmission status of a target packet data network (PDN) connection, location area information corresponding to the target PDN connection, and a current location of a user equipment, wherein the target PDN connection is any one or more of a plurality of PDN connections maintained by the user equipment; and
- releasing the target PDN connection when the user equipment determines that a first condition is met, wherein the first condition comprises: the service transmission status of the target PDN connection is that service transmission has stopped, and a location area indicated by the location area information corresponding to the target PDN connection does not comprise the current location of the user equipment, and wherein the location area indicated by the location area information of the target PDN connection does not comprise an area adjacent to the current location of the user equipment, the adjacent area being at least one location through which the user equipment passes in a mobile handover process.

* * * * *